United States Patent
Tang

(10) Patent No.: US 6,644,928 B1
(45) Date of Patent: Nov. 11, 2003

(54) RETRACTABLE SUSPENSION DEVICE OF A CEILING FAN

(76) Inventor: David Tang, No. 3, Nong 5, Lane 66, Yang Ming St., Feng Yuan City, Taichung Hsien (TW)

( * ) Notice: Subject to any disclaimer, the term of this patent is extended or adjusted under 35 U.S.C. 154(b) by 2 days.

(21) Appl. No.: 10/133,278

(22) Filed: Apr. 29, 2002

(51) Int. Cl.[7] ............................................. F04D 29/64
(52) U.S. Cl. ..................... 416/246; 416/5; 416/244 R
(58) Field of Search ...................... 416/246, 5, 244 R, 416/210 R, 214 R; 248/343, 317

(56) References Cited

U.S. PATENT DOCUMENTS

| | | | | |
|---|---|---|---|---|
| 4,640,668 A | * | 2/1987 | Yang | 417/354 |
| 6,240,247 B1 | * | 5/2001 | Reiker | 392/364 |
| 6,311,943 B1 | * | 11/2001 | Tang | 248/343 |
| 6,394,757 B1 | * | 5/2002 | Lackey | 416/244 R |
| 6,488,439 B1 | * | 12/2002 | Lackey, Sr. | 403/305 |

* cited by examiner

Primary Examiner—Edward K. Look
Assistant Examiner—J. M. McAleenan
(74) Attorney, Agent, or Firm—Charles E. Baxley

(57) ABSTRACT

A retractable suspension device of a ceiling fan includes an upper tube, a mounting base movably mounted on the upper tube, an urging member secured on the mounting base to move therewith and capable of urging the upper tube, a compression race rotatably mounted on the mounting base and releasably compressed on the urging member for compressing the urging member to urge the upper tube, and a lower tube secured on the mounting base to move therewith and telescopically mounted in the upper tube. Thus, the retractable suspension device has an adjustable length, so that the height and the length of the ceiling may be arbitrarily adjusted and changed by adjustment of the relative distance between the upper tube and the lower tube, thereby enhancing the versatility of the ceiling fan.

10 Claims, 2 Drawing Sheets

RETRACTABLE SUSPENSION DEVICE OF A CEILING FAN

BACKGROUND OF THE INVENTION

1. Field of the Invention

The present invention relates to a retractable suspension device of a ceiling fan, and more particularly to retractable suspension device of a ceiling fan, wherein the retractable suspension device has an adjustable length, so that the height and the length of the ceiling may be arbitrarily adjusted and changed by adjustment of the relative distance between the upper tube and the lower tube, thereby enhancing the versatility of the ceiling fan.

2. Description of the Related Art

A conventional ceiling fan in accordance with the prior art comprises a down rod mounted between a mounting bracket that is secured to the ceiling and a motor yoke/coupler that is used to support the motor and the blades of the ceiling fan. However, the down rod of the conventional ceiling fan has a fixed length which cannot be adjusted, so that the height and length of the ceiling fan is fixed without possibility of adjustment, thereby limiting the versatility of the ceiling fan.

SUMMARY OF THE INVENTION

The present invention has arisen to mitigate and/or obviate the disadvantage of the conventional ceiling fan.

The primary objective of the present invention is to provide a retractable suspension device of a ceiling fan, wherein the retractable suspension device has an adjustable length, so that the height and the length of the ceiling may be arbitrarily adjusted and changed by adjustment of the relative distance between the upper tube and the lower tube, thereby enhancing the versatility of the ceiling fan.

In accordance with the present invention, there is provided a retractable suspension device of a ceiling fan, comprising:

an upper tube;

a mounting base, movably mounted on the upper tube;

an urging member, secured on the mounting base to move therewith and capable of urging the upper tube;

a compression race, rotatably mounted on the mounting base and releasably compressed on the urging member, for compressing the urging member to urge the upper tube; and a lower tube, secured on the mounting base to move therewith and telescopically mounted in the upper tube.

Further benefits and advantages of the present invention will become apparent after a careful reading of the detailed description with appropriate reference to the accompanying drawings.

DETAILED DESCRIPTION OF THE INVENTION

Figure 1:
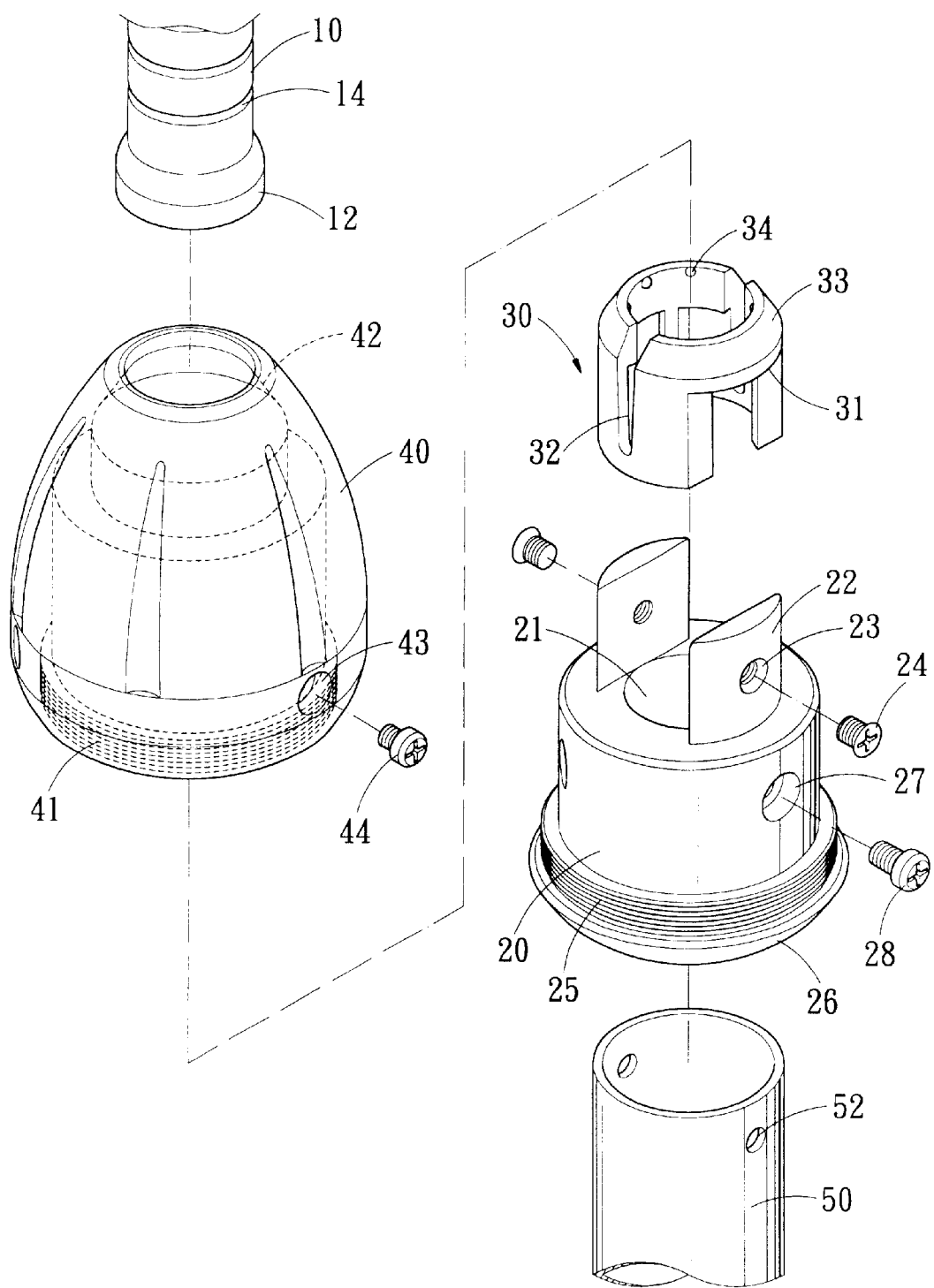
FIG. 1 is an exploded perspective view of a retractable suspension device of a ceiling fan in accordance with a preferred embodiment of the present invention.
Figure 2:
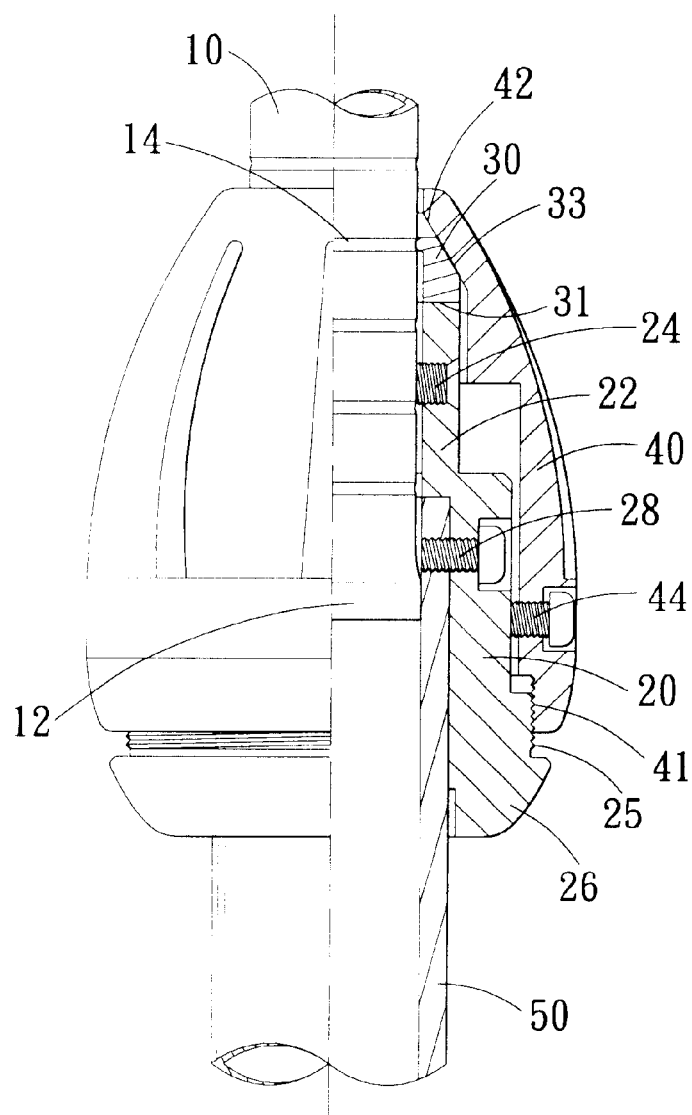
FIG. 2 is a side plan partially cross-sectional assembly view of the retractable suspension device of a ceiling fan as shown in FIG. 1.

Referring to FIGS. 1 and 2, a retractable suspension device of a ceiling fan in accordance with a preferred embodiment of the present invention comprises an upper tube 10 secured to a mounting bracket (not shown) of the ceiling fan, a mounting base 20 movably mounted on the upper tube 10, an urging member 30 secured on the mounting base 20 to move therewith and capable of urging the upper tube 10, a compression race 40 rotatably mounted on the mounting base 20 and releasably compressed on the urging member 30, for compressing the urging member 30 to urge the upper tube 10, and a lower tube 50 secured on the mounting base 20 to move therewith and telescopically mounted in the upper tube 10.

The upper tube 10 has an upper end secured to the mounting bracket (not shown) of the ceiling fan, and a lower end formed with a catch flange 12 extending radially outward. The upper tube 10 has an outer wall formed with multiple annular grooves 14.

The mounting base 20 has an inner wall formed with a passage 21 for receiving the upper tube 10 therein. The mounting base 20 has a top provided with two radially opposite support posts 22 each formed with a screw bore 23 for screwing one of two retaining screws 24. Each of the retaining screws 24 may lock and retain the catch flange 12 of the upper tube 10 when the mounting base 20 is moved to the bottom of the upper tube 10, thereby preventing the mounting base 20 from detaching from the upper tube 10. The mounting base 20 has a bottom formed with an outer thread 25 which has a bottom formed with a stop flange 26 extending radially outward.

The mounting base 20 is formed with multiple through holes 27 for passage of one of multiple locking bolts 28. The lower tube 50 has an upper end received in the passage 21 of the mounting base 20 and formed with multiple screw bores 52 each aligning with one of the multiple through holes 27 of the mounting base 20. Each of the multiple locking bolts 28 is in turn extended through one of the multiple through holes 27 of the mounting base 20, and is screwed into one of the multiple screw bores 52 of the lower tube 50, thereby securing the lower tube 50 in the mounting base 20. The lower tube 50 has a lower end connected with a motor yoke/coupler (not shown) of the ceiling fan.

The urging member 30 has an outer wall formed with two radially opposite receiving recesses 31 for receiving the two radially opposite support posts 22 of the mounting base 20, so that the urging member 30 is secured on the mounting base 20 to move therewith. The urging member 30 is formed with multiple slits 32, so that the urging member 30 has a flexible feature, and may be compressed radially inward. The urging member 30 has a top formed with a tapered face 33. The urging member 30 has an inner wall provided with multiple retaining bosses 34 that may be secured in one of the annular grooves 14 of the upper tube 10 when the urging member 30 is compressed radially inward, so that the urging member 30 may be secured on the upper tube 10.

The compression race 40 has an inner wall having a bottom formed with an inner thread 41 threadedly mounted on the outer thread 25 of the mounting base 20, so that the compression race 40 may be rotated on the mounting base 20. The rotation of the compression race 40 on the mounting base 20 may be limited by the stop flange 26 of the mounting base 20. The inner wall of the compression race 40 has a top formed with a tapered face 42 that may be urged on the tapered face 33 of the urging member 30 when the compression race 40 is rotated on the mounting base 20, so that the urging member 30 may be compressed radially inward to compress and urge the upper tube 10. The compression race 40 has a lower portion formed with multiple screw bores 43 for screwing one of multiple retaining bolts 44. Each of the multiple retaining bolts 44 may be rested on the outer wall of the mounting base 20, thereby temporarily retaining the compression race 40 on the mounting base 20 when not in use.

In operation, each of the multiple retaining bolts 44 may be unscrewed to release its connection with the outer wall of the mounting base 20, so that the compression race 40 may be rotated on the mounting base 20 freely. Then, the compression race 40 may be rotated on the mounting base 20 to move downward, whereby the tapered face 42 of the compression race 40 may be moved downward to urge and compress the tapered face 33 of the urging member 30, so that the urging member 30 may be compressed radially inward to compress and urge the outer wall of the upper tube 10, so that the mounting base 20 together with the lower tube 50 may be secured on the upper tube 10. At the same time, the multiple retaining bosses 34 of the urging member 30 may be locked in one of the annular grooves 14 of the upper tube 10 when the urging member 30 is compressed radially inward, thereby locking the urging member 30 on the upper tube 10, so that the mounting base 20 together with the lower tube 50 may be secured on the upper tube 10 rigidly and stably.

On the contrary, the compression race 40 may be rotated on the mounting base 20 to move upward, whereby the tapered face 42 of the compression race 40 may be moved upward to detach from the tapered face 33 of the urging member 30, so that the urging member 30 may be expanded outward by its restoring force to detach from the outer wall of the upper tube 10, so that the mounting base 20 together with the lower tube 50 may be freely moved on the upper tube 10, so as to adjust the relative distance between the upper tube 10 and the lower tube 50.

After adjustment of the relative distance between the upper tube 10 and the lower tube 50 is accomplished, the compression race 40 may be rotated on the mounting base 20 to move downward again, whereby the tapered face 42 of the compression race 40 may be moved downward to urge and compress the tapered face 33 of the urging member 30, so that the urging member 30 may be compressed radially inward to compress and urge the outer wall of the upper tube 10, so that the mounting base 20 together with the lower tube 50 may be secured on the upper tube 10. At the same time, the multiple retaining bosses 34 of the urging member 30 may be locked in another one of the annular grooves 14 of the upper tube 10 when the urging member 30 is compressed radially inward, thereby locking the urging member 30 on the upper tube 10, so that the mounting base 20 together with the lower tube 50 may be secured on the upper tube 10 rigidly and stably.

Accordingly, the retractable suspension device of a ceiling fan in accordance with a preferred embodiment of the present invention has an adjustable length, so that the height and the length of the ceiling may be arbitrarily adjusted and changed by adjustment of the relative distance between the upper tube 10 and the lower tube 50, thereby enhancing the versatility of the ceiling fan.

While the preferred embodiment of the present invention has been shown and described, it will be apparent to those skilled in the art that various modifications may be made in the embodiment without departing from the spirit of the present invention. Such modifications are all within the scope of the present invention.

What is claimed is:

1. A retractable suspension device of a ceiling fan, comprising:

an upper tube;

a mounting base, movably mounted on the upper tube;

an urging member, secured on the mounting base to move therewith and capable of urging the upper tube;

a compression race, rotatably mounted on the mounting base and releasably compressed on the urging member, for compressing the urging member to urge the upper tube; and a lower tube, secured on the mounting base to move therewith and telescopically mounted in the upper tube.

2. The retractable suspension device of a ceiling fan in accordance with claim 1, wherein the upper tube has an upper end secured to a mounting bracket of the ceiling fan, and a lower end formed with a catch flange extending radially outward, the mounting base has a top provided with two radially opposite support posts each formed with a screw bore for screwing one of two retaining screws, each of the retaining screws may lock and retain the catch flange of the upper tube when the mounting base is moved to a bottom of the upper tube, thereby preventing the mounting base from detaching from the upper tube.

3. The retractable suspension device of a ceiling fan in accordance with claim 2, wherein the urging member has an outer wall formed with two radially opposite receiving recesses for receiving the two radially opposite support posts of the mounting base, so that the urging member is secured on the mounting base to move therewith.

4. The retractable suspension device of a ceiling fan in accordance with claim 1, wherein the mounting base is formed with multiple through holes for passage of one of multiple locking bolts, the lower tube has an upper end received in the passage of the mounting base and formed with multiple screw bores each aligning with one of the multiple through holes of the mounting base, each of the multiple locking bolts is in turn extended through one of the multiple through holes of the mounting base, and is screwed into one of the multiple screw bores of the lower tube, thereby securing the lower tube in the mounting base.

5. The retractable suspension device of a ceiling fan in accordance with claim 1, wherein the mounting base has an inner wall formed with a passage for receiving the upper tube therein.

6. The retractable suspension device of a ceiling fan in accordance with claim 1, wherein the urging member is formed with multiple slits, so that the urging member has a flexible feature, and may be compressed radially inward.

7. The retractable suspension device of a ceiling fan in accordance with claim 1, wherein the upper tube has an outer wall formed with multiple annular grooves, the urging member has an inner wall provided with multiple retaining bosses that may be secured in one of the annular grooves of the upper tube when the urging member is compressed radially inward, so that the urging member may be secured on the upper tube.

8. The retractable suspension device of a ceiling fan in accordance with claim 1, wherein the mounting base has a bottom formed with an outer thread which has a bottom formed with a stop flange extending radially outward, the compression race has an inner wall having a bottom formed with an inner thread threadedly mounted on the outer thread of the mounting base, so that the compression race may be rotated on the mounting base.

9. The retractable suspension device of a ceiling fan in accordance with claim 1, wherein the urging member has a top formed with a tapered face, the compression race has an inner wall having a top formed with a tapered face that may be urged on the tapered face of the urging member when the compression race is rotated on the mounting base, so that the urging member may be compressed radially inward to compress and urge the upper tube.

10. The retractable suspension device of a ceiling fan in accordance with claim 1, wherein the compression race has a lower portion formed with multiple screw bores for screwing one of multiple retaining bolts, each of the multiple retaining bolts may be rested on the outer wall of the mounting base, thereby temporarily retaining the compression race on the mounting base when not in use.

* * * * *